15

(12) United States Patent
Siddiqui et al.

(10) Patent No.: US 9,260,586 B2
(45) Date of Patent: Feb. 16, 2016

(54) SMECTITE CLAY LOW-DENSITY POLYETHYLENE NANOCOMPOSITE

(71) Applicant: KING FAHD UNIVERSITY OF PETROLEUM AND MINERALS, Dhahran (SA)

(72) Inventors: Mohammad N. Siddiqui, Dhahran (SA); Halim H. Redhwi, Dhahran (SA); Syed Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/846,717

(22) Filed: Sep. 4, 2015

(65) Prior Publication Data

US 2015/0376370 A1    Dec. 31, 2015

Related U.S. Application Data

(63) Continuation of application No. 14/151,349, filed on Jan. 9, 2014, now Pat. No. 9,145,491.

(51) Int. Cl.
| | |
|---|---|
| C08K 3/36 | (2006.01) |
| C08K 3/22 | (2006.01) |
| B29C 45/00 | (2006.01) |
| C08K 3/34 | (2006.01) |
| C08K 5/19 | (2006.01) |

(52) U.S. Cl.
CPC . *C08K 3/346* (2013.01); *C08K 3/22* (2013.01); *C08K 3/36* (2013.01); *C08K 5/19* (2013.01); C08K 2003/2296 (2013.01)

(58) Field of Classification Search
CPC ............. C08K 5/544; C08K 3/36; C08K 3/22
See application file for complete search history.

(56) References Cited

U.S. PATENT DOCUMENTS

| | | | |
|---|---|---|---|
| 7,884,149 B2 | 2/2011 | Nelson et al. | |
| 7,923,500 B2 * | 4/2011 | Siegel | C08K 3/22 524/430 |
| 8,124,681 B2 | 2/2012 | Sullivan et al. | |
| 2006/0167139 A1 | 7/2006 | Nelson et al. | |
| 2007/0149678 A1 | 6/2007 | Apoorva et al. | |
| 2012/0061867 A1 * | 3/2012 | Dougherty, Jr. | B29C 44/3461 264/13 |
| 2013/0158180 A1 | 6/2013 | Tsou et al. | |

FOREIGN PATENT DOCUMENTS

| | | |
|---|---|---|
| JP | 2009-114509 A | 5/2009 |
| RU | 2441835 C2 | 2/2012 |

OTHER PUBLICATIONS

Cayetano Espejo, Alejandro Arribas, Fuensanta Monzo, Pedro Pablo Diez, "Nanocomposite films with enhanced radiometric properties for greenhouse covering applications", Mar. 2012, Journal of Plastic Film and Sheeting, vol. 28, No. 4, (1 page).

Fuqiang Tian, Qingquan Lei, Xuan Wang, Yi Wang, "Investigation of electrical properties of LDPE/ZnO nanocomposite dielectrics", Jun. 2012, Dielectrics and Electrical Insulation, IEEE Transactions vol. 19, Issue: 3, (1 page).

P. Mederic, L. Le Pluart, T. Aubry, P.-J. Madec, "Structure of rheology of polyethylene/imidazolium-based montmorillonite nanocomposites", Apr. 2012, Journal of Applied Polymer Science vol. 127, Issue 2, (3 pages).

Seok-In Hong, Jong-Whan Rhim, "Preparation and properties of melt-intercalated linear low-density polyethylene/clay nanocomposite films prepared by blow extrusion", Sep. 2012, LWT—Food Science and Technology, vol. 48, Issue 1, (4 pages).

U.S. Appl. No. 14/846,716, filed Sep. 4, 2015, Siddiqui, et al.

* cited by examiner

*Primary Examiner* — Robert Harlan

(74) *Attorney, Agent, or Firm* — Oblon, McClelland, Maier & Neustadt, L.L.P.

(57) ABSTRACT

A low-density polyethylene nanocomposite comprising 5 weight percent or more of at least one nanoscale filler selected from the group consisting of montmorillonite clay, silica and zinc oxide. Changes in weatherability of the three low-density polyethylene nanocomposites based on the nanoscale fillers are determined. A surface area of the nanoscale filler in the nanocomposites is from 10 $m^2/g$ to 50 $m^2/g$.

6 Claims, 4 Drawing Sheets

US 9,260,586 B2

SMECTITE CLAY LOW-DENSITY POLYETHYLENE NANOCOMPOSITE

CROSS REFERENCE TO RELATED APPLICATIONS

This application is a continuation application of U.S. application Ser. No. 14/151,349.

BACKGROUND OF THE INVENTION

1. Field of the Disclosure

The present invention relates to a low-density polyethylene nanocomposite comprising 5% by weight or more of nanoscale fillers of montmorillonite clay, silica and zinc oxide, a method for making the low-density polyethylene nanocomposite, and determination of changed weatherability and durability of the nanocomposite due to the nanoscale fillers.

2. Description of Related Art

Industrial and research interest in thermoplastic nanocomposites stems from the expectation that nanoscale fillers potentially impart dramatically improved properties at low loading. This is reasonable because of the high particle densities (106-108 particles per sq. micron), the exceptionally high interfacial area generated (103-104 sq. m. per ml) and proximity of particles in the matrix (Vaia R. A. and Wagner H. D. (2004) *Framework for nanocomposites Mater Today*, 7:32-7—incorporated by reference in its entirety). Increased interphase volume at the same volume fraction of filler is particularly advantageous as it is this volume that yields the superior properties of any composite (Schadler L. S. (2003) *Polymer-based and polymer-filled nanocomposites In*: Ajayan P M, Schadler L S, Braun P V, editors. *Nanocomposite science and technology*, Weinheim, Germany: Wiley-VCH—incorporated by reference in its entirety).

The specific surface area is particularly large in layered silicate clays including Montmorillonite clay (MMT) which is a superior nanofiller especially when the polymer is intercalated between the plate-like morphology. This is achieved in the laboratory with in-situ polymerization or template synthesis in the matrix (Utracki L. A., Sepehr M., Boccaleri E. (2007) *Polymer Advanced Technologies*, 18:1-37; Utracki L. A., Sepehr M., Boccaleri E. (2007) *Polymer Advanced Technologies*, 18:1-37; Cheng W., Miao W., Peng J., Zou W., Zhang L. (2009) *Iranian Polymer Journal*, 18, pp. 365-371; Zhang J. G. and Wilkie C. A. (2003) *Polymer Degradation and Stability*, 80, pp. 163-169; Zhang M. Q., Rong M. Z., Zhang H. B., Friedrich K. (2003) *Polymer Engineering & Science*, 43, pp. 490-500; Gopakumar T. G., Lee J. A., Kontopoulou M., Parent J. S. (2002) *Polymer*, 43, pp. 5483-5491—incorporated by reference in its entirety). However, industrial applications are likely to rely on melt-intercalation, often with the use of a compatibilizer (Wang K. H., Choi M. H., Koo C. M., Xu M. Z., Chung I. J., Jang M. C. (2002) *Journal of Polymer Science, Part B: Polymer Physics*, 40, pp. 1454-1463; Wang K. H., Chung I. J., Jang M. C., Keum J. K., Song H. H. (2002) *Macromolecules*, 35, pp. 5529-5535; Sanchez-Valdes S., Lopez-Quintanilla M. L., Ramirez-Vargas E., et al., (2006), *Macromolecular Materials and Engineering*, 291, pp. 128, 2006—incorporated by reference in its entirety). The blending is carried out usually in a compounding extruder. Melt compounding is more likely to break-up aggregates and facilitate good dispersion with simple nanoparticles. This is particularly true of layered silicate nanofillers such as MMT. Nanoparticles, having no layered structure have relatively lower specific surface area, but are relatively easier to disperse in the polymer matrix.

Successful incorporation of nanomaterials into thermoplastics and melt blending of clay and silica with polyethylene can be successfully achieved (Wei L., Tang T., Huang B. (2004) *Journal of Polymer Science Part A: Polymer Chemistry*, 42, pp. 941-949; Zhang J. G. and Wilkie C. A. (2003) *Polymer Degradation and Stability*, 80, pp. 163-169; Zhang M. Q., Rong M. Z., Zhang H. B., Friedrich K. (2003) *Polymer Engineering & Science*, 43, pp. 490-500—incorporated by reference in its entirety). For instance, Sanchez et al. studied polyethylene/MMT nanocomposites films prepared by melt blending low-density polyethylene (LDPE) with MMT using maleic anhydride grafted polyethylene (LDPE-g-MA) as a compatibilizer (Sanchez-Valdes S., Lopez-Quintanilla M. L., Ramirez-Vargas E., et al., (2006), *Macromolecular Materials and Engineering*, 291, pp. 128, 2006—incorporated by reference in its entirety).

BRIEF SUMMARY

An objective of the invention is a low-density polyethylene nanocomposite comprising 5% by weight or more of at least one nanoscale filler selected from the group consisting of montmorillonite clay, silica and zinc oxide.

In one embodiment of the invention, the nanocomposite comprises nanoscale montmorillonite clay modified with a quaternary ammonium salt.

In another embodiment the quaternary ammonium salt is N,N-dimethyl dehydrogenated tallow quaternary ammonium chloride.

In another embodiment of the invention the nanocomposite is nanoscale silica.

In one aspect of the invention the nanocomposite is zinc oxide.

In another aspect of the invention the surface area of the nanoscale filler is from 10 $m^2$/g to 50 $m^2$/g.

DETAILED DESCRIPTION

Figure 1:
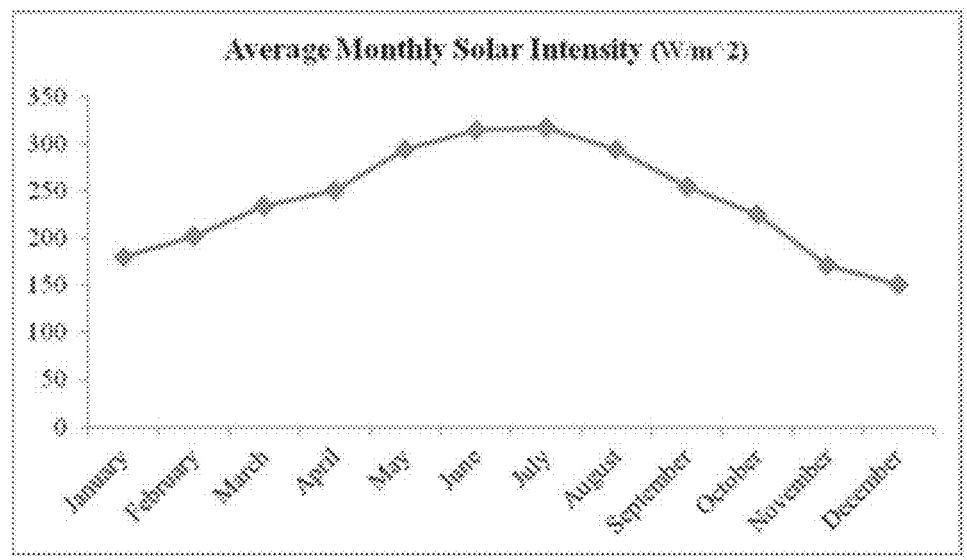
FIG. 1 is a graph of average annual solar intensity variation at a desert exposure site in Dhahran.

In the present disclosure, three low-density polyethylene (LDPE) nanocomposites based on the nanoscale fillers, montmorillonite clay, silica and zinc oxide were studied to determine if the reinforcement they imparted was accompanied by any change in the weatherability of the nanocomposite. Changes in weathering behavior were monitored in samples exposed to natural weathering outdoors over a period of 24 months of exposure. Because of superior light-shielding afforded by the high specific surface area of nanofillers, a stabilization effect was anticipated. Compared to unfilled LDPE, the weatherability in all three nanocomposites did not significantly change due to the presence of 5 wt % of the nanofillers, due to chemical effects that enhanced weatherability. The efficient reinforcement afforded by the nanofillers was not accompanied by a loss or enhancement in durability of the material.

In aspects of the disclosure, the nanocomposites comprise from 5 to 30% by weight of the nanoscale fillers, preferably from 10 to 25%, especially preferably from 15 to 20%. In this disclosure, nanocomposites obtained at constant weight fraction of three fillers with very different characteristics are compared.

Low-density polyethylene as used herein is a thermoplastic made from the monomer ethylene. The structure of LDPE has more branching than high-density polyethylene, resulting in weaker intermolecular forces, lower tensile strength, and higher resilience. The side branches lead to less tightly packed and less crystalline molecules, yielding a lower density. Preferably, the low-density polyethylene is not a linear low-density polyethylene.

A density range of LDPE is from 0.910 to 0.940 g/cm$^3$, preferably from 0.915 to 0.930 g/cm$^3$, especially preferably from 0.920 to 0.925 g/cm$^3$. The structure of LDPE has branching on of from 1 to 10% of its carbon atoms, preferably from 2 to 5% of its carbon atoms, especially preferably on about 2% of its carbon atoms. The chains are branched at intervals of from 10 to 60 carbon atoms, preferably from 20 to 50 carbon atoms, especially preferably from 30 to 40 carbon atoms.

A melt index of LDPE is from 0.8 to 1.2 g/10 minutes, preferably from 0.9 to 1.1 g/10 minutes, especially preferably from 0.95 to 1.05 g/10 minutes (190° Celsius, 2.16 kg).

The molecular weight of LDPE is from 10,000 to 300,000, preferably from 25,000 to 250,000, especially preferably from 50,000 to 100,000.

Examples of low-density polyethylene include, but are not limited to, Exxon Mobil LDPE LD160AT, Sabic LDPE, and BASF LDPE.

Montmorillonite is a member of the Smectite family, which is tactoids of nanoscale plates, having a 2:1 clay ratio. The 2:1 clay ratio designates that it has 2 tetrahedral sheets sandwiching a central octahedral sheet. The particles are plate-shaped with an average diameter of approximately one micrometer. Montmorillonite has general formula:

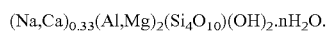

$(Na,Ca)_{0.33}(Al,Mg)_2(Si_4O_{10})(OH)_2 \cdot nH_2O$.

The specific surface area of montmorillonite clay of the present invention is about 10.9 m$^2$/g, and an average agglomerate size is about 8 μm. The specific surface area ranges 5 to 20 m$^2$/g, preferably from 8 to 15 m$^2$/g, especially preferably from 9 to 12 m$^2$/g. The average agglomerate size ranges from 5 to 30 μm, preferably from 7 to 20 μm, especially preferably from 10 to 15 μm. The montmorillonite is composed of individual platelets of about 1 nm in thickness with an aspect ratio of >50. The interlayer spacing, determined by XRD, is about 2.52 nm. The interlayer spacing ranges from 2.5 to 2.6 nm, preferably from 2.52 to 2.58 nm, and from 2.52 to 2.54 nm.

In the present invention, the montmorillonite clay is modified with a quaternary ammonium salt. Preferably, the montmorillonite clay is modified with a N,N-dimethyl dehydrogenated tallow quaternary ammonium chloride. A concentration of the quaternary ammonium salt to the clay is about 95 mequiv/100 g clay. The concentration of the quaternary ammonium salt to the clay ranges from 80 mequiv/100 g clay to 100 mequiv/100 g clay, from 85 mequiv/100 g clay to 98 mequiv/100 g clay, and especially preferably from 90 mequiv/100 g clay to 95 mequiv/100 g clay. Preferably, the montmorillonite clay is not organomodified.

Nanoscale silica as used herein is a fumed silica which is a hydrophilic filler that tends to form a 3-D network by hydrogen-bonded association. Fumed silica is produced in a flame, and comprises microscopic droplets of amorphous silica fused into branched, chainlike, three-dimensional secondary particles which then agglomerate into tertiary particles. The resulting powder has an extremely low bulk density and high surface area. The three-dimensional structure of fumed silica results in viscosity-increasing, thixotropic behavior when used as a thickener or reinforcing filler. The primary particle size of the nanoscale silica filler is from 5 to 50 nm, preferably from 10 to 40 nm, from 20 to 40 nm, and especially preferably about 40 nm. In the present invention, the particles are non-porous and have a surface area of about 50 m$^2$/g. The surface area ranges from 5 m$^2$/g to 100 m$^2$/g, preferably from 20 m$^2$/g to 80 m$^2$/g, especially preferably from 40 m$^2$/g to 60 m$^2$/g. A density of the silica is from 160 to 190 kg/m$^3$, preferably from 165 to 185 kg/m$^3$, especially preferably from 170 to 180 kg/m$^3$. Because the nanosilica as received has approximately 1.5% water, the nanofiller is dried prior to incorporating into the polymer.

Zinc oxide is an inorganic compound that crystallizes in two main forms, hexagonal wurtzite and cubic zincblende. The wurtzite structure is most stable at ambient conditions and thus most common. The zincblende form can be stabilized by growing ZnO on substrates with cubic lattice structure. In both cases, the zinc and oxide centers are tetrahedral. Zinc oxide nanoscale filler as used herein is a spherical oxide filler, which is a free flowing powder with a density of about 5.6 g/cm$^3$, an average particle size of about 30 nm (TEM and BET), and a specific surface area (BET) of about 35 m$^2$/g. The density ranges from 4.0 to 8.0 g/cm$^3$, preferably from 5.0 to 7.0 g/cm$^3$, especially preferably from 5.5 to 6.5 g/cm$^3$. The average particle size ranges from 5 nm to 50 nm, preferably from 10 to 40 nm, and especially preferably from 20 to 30 nm. The specific surface area ranges from 5 to 100 m$^2$/g, preferably from 15 to 75 m$^2$/g, especially preferably from 25 to 50 m$^2$/g.

Examples

Nanoscale fillers MMT Clay-Cloisite 20A (Nanocor, Hoffman Estates, IL), Zinc Oxide (Advanced Materials, Manchester, Conn.), and Nano Silica Aerosil OX 50 (Evonik, Addison, Ill.) were used as materials. Cloisite 20, montmorillonite clay modified with a quaternary ammonium salt, was all used as received. Melt mixing of the nanoscale fillers with the injection-moldable grade LDPE was carried out in a Theyson TSK 21 mm Twin Screw extruder. The screw rpm was controlled at 215-218 during extrusion and the melt temperature was maintained in the range of 375 F to 401 F (190 to 205° C.). The compounded resin with 5 wt. percent of nanofiller was pelletized and stored dry. Injection molding of the ASTM Type I test pieces was carried out on a 165 ton Engel Machine at a nozzle temperature of 420 F (215° C.) and an injection pressure of 5000 psi. Test pieces were stored in the dark at ambient temperature until the testing and/or exposure experiments. Properties of the fillers are summarised in Table I.

Tensile testing was done according to ASTM D 638 using an Instron Tensile Testing machine, Model 3367. Testing was carried out at a strain rate of 10 mm/min. Load displacement data was recorded digitally.

Microstructural characterization was carried out using a Scanning Electron Microscope, model JEOL JSM-6064LV. The micrographs were taken at 15 kV accelerating voltage and at various magnifications. Infrared spectra (IR) were recorded on a Perkin Elmer Model 16F PC FT-IR spectrophotometer loaded with Spectrum V 2.00 software (Massachusetts, USA).

Hardness measurements on the Shore D scale were done using Durometer-Digi Test of Bareiss Germany according to ASTM D 2240 standard. An indenter cone with an angle of 30° and a contact pressure force of 5100 g was used with the depth of penetration set equal to 2.5 mm.

TABLE I

Summary of Nanofiller Characteristics

| Filler | Shape | Density (g/cc) | Volume Fraction | Nominal BET (sq. m./g) |
|---|---|---|---|---|
| MMT Clay | Platelet | 2.86 | 0.027 | 750 |
| Zinc Oxide | Spherical | 5.6 | 0.009 | 35 |
| Silica | Spherical | 2.1 | 0.023 | ~50 |

In the first part of this series, the relative efficiency of reinforcement ($\Delta$Modulus/$V_f$), by the different nanofillers was found to decrease in the order Silica>MMT Clay>ZnO. Given the high BET value obtained for the MMT material (i.e. 750 sq. m./g) and the compatibilization afforded by the chemical functionalization, high efficiency was obtained for MMT. The polar silanol groups on the nano-silica resulted in agglomeration of the filler into a 3-dimensional network structure that served as a particularly good reinforcing filler.

Tensile Properties

Outdoor weathering of the nanocomposite samples were carried out under desert exposure conditions (at an exposure site in Dhahran, Saudi Arabia). The harsh weathering conditions are reflected in the plot of average monthly temperature and solar UV flux shown in FIG. 1. Table II shows the change in average values of the tensile properties obtained on weathering exposure. The auto-oxidative degradation mechanism of LDPE matrix is initiated by solar UV radiation. Tensile data would show any changes in the degradation due to the presence of fillers. These may be prooxidant effects due to catalysis by oxides or modifiers used in MMT, or the protective action of nanofillers in retarding degradation. Latter can be expected due to efficient light-shielding by the nanoscale filler particles. The average ultimate extension values are particularly sensitive to oxidative degradation of polyolefins. The data are summarized in Table II below.

Figure 2:
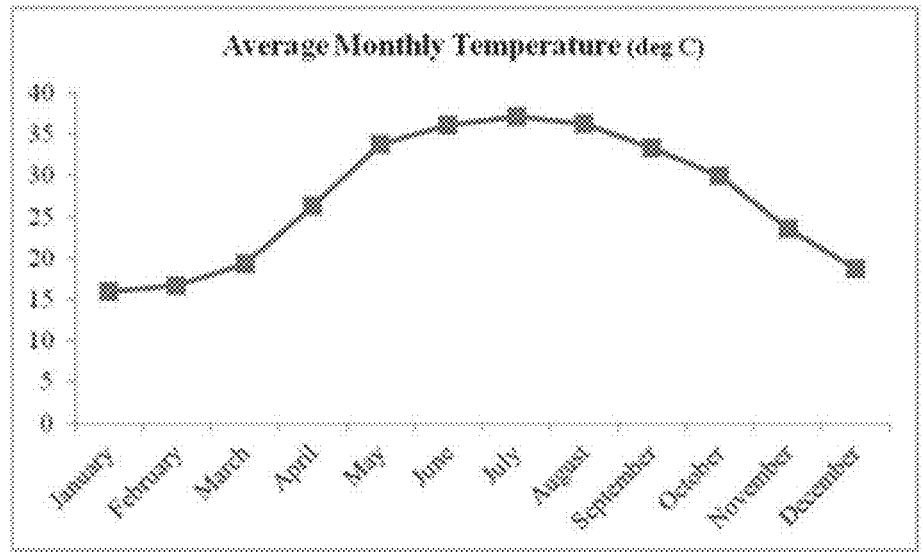
FIG. 2 is a graph of average temperature variation at a desert exposure site in Dhahran.

The data, however, show no indication of any significant effect of either the nanoclay or nano-zinc oxide fillers on the weathering-related degradation of LDPE. Within experimental error, the materials behaved the same as the control samples did, especially in plots of changes in ultimate extensibility (see FIG. 2). This is in contrast to the findings reported by Huaili et al. on accelerated weathering of LDPE/MMT nanocomposites, where a pro-oxidant effect of the nanoclay filler was reported (Huaili Q., Chungui Z., Shimin Z., Guangming C., and Mingshu Y. (2003) *Polymer Degradation and Stability*, 81:497—incorporated by reference in its entirety). A key difference is that Huaili et al. assessed degradation using the increase in carbonyl absorption band at 1710 cm$^{-1}$ in the FTIR spectrum. Some of the changes in FTIR spectra can take place as a result of oxidation of the modifier (octadecyl chains) used in the MMT and are not distinguishable from oxidation of LDPE. About 38% by weight of Closite 20 is the organic modifier. Oxidation of modifier would not contribute to changes in tensile properties used to assess degradation of the nanocomposites in the present study. While melt blending was used in both studies, the organic modifier in the clay used in Huaili et al. study was di-octadecyl dimethyl ammonium chloride whereas in the present Closite 20 it was dimethyl, dehydrogenated tallow, quaternary ammonium.

Silica nanocomposites in contrast to the other two fillers show accelerated degradation relative to the LDPE control. Silica powders are reported to be pro-oxidants in low molecular weight (up to 15,000 g./mol.) hydroxyl-terminated polyethylenes (Sitnikova O. G., Nazarov S. B., Shikhanova I. V., Agafonov A. V., Dyuzhev J. A., Popoval I. G. (2010) *Pharmacology & Pharmacy*, Vol. 1 Issue 2, pp. 69-74—incorporated by reference in its entirety). They are believed to catalyze the peroxidation step during autoxidation. Silica powder also promotes free-radical production in biological systems (Shen H. M., Zhang Z., Zhang Q. F. and Ong C. N., (2001) *American Journal of Physiology Lung Cellular and Molecular Physiology*, Vol. 280, No. 1, pp. 10-17—incorporated by reference in its entirety). The highly efficient reinforcement by silica nanoparticles was attributed to 3-D network formation of particles due to agglomeration via silanol group interactions (Redhwi H. H., Siddiqui M. N., Andrady A. L., and Syed Hussain (2013) *Journal of Nanomaterials*, Volume 2013, Article ID 654716, 6 pages—incorporated by reference in its entirety). In such a system any disruption of the network structure due to weathering will have a very large effect on reinforcement afforded by the nanofiller network. The drastic drop in the tensile strength of silica nanocomposites even during early aging is consistent with this expectation.

However, the yield strength of nanocomposites increased during early weathering. Remarkably, that of the nanocomposites containing $SiO_2$ increased by 150% both after 6 month of exposure and at 9 months exposure, gradually decreasing thereafter. On the other hand, tensile strength at break as well as the elongation at break gradually reduced during the entire duration of exposure. The phenomenon has been reported for HDPE/silica nanocomposites (Grigoriadou I., Paraskevopoulos K. M., Chrissafis K., Pavlidou E., Stamkopoulos T. G., Bikiaris D. (2011) *Polymer Degradation and Stability*, 96(1), pp. 151-163—incorporated by reference in its entirety). However, this behavior is unlikely to be filler-related as it is also seen in the unfilled sample (see Table II) and reported for HDPE as well, though to a much lesser extent. This is attributed to stiffening due to crosslinking in the amorphous phase where more oxygen is available. However, as degradation progresses, chain scission dominates and values of all tensile parameters decrease with exposure time.

TABLE II

Change in Tensile Properties during Outdoor Weathering of Nanocomposites Mean value with standard deviation in [ . . . ] is shown

| Exposure Duration | No Filler | Nanoclay | Silica | Zinc Oxide |
|---|---|---|---|---|
| 0 Months Exposure | | | | |
| Average Tensile Strength (MPa) | 10.21 [0.14] | 10.21 [0.25] | 10.74 [0.08] | 10.54 [0.03] |
| Average Extensibility (%) | 172.12 [4.93] | 169.0 [1.78] | 153.86 [1.27] | 159.47 [6.20] |
| Average Yield Strength (MPa) | 35.38 [0.64] | 89.90 [1.88] | 44.21 [0.73] | 89.18 [1.40] |
| Average Maximum Load (N) | 390.19 [5.39] | 389.81 [1.93] | 416.78 [1.51] | 404.36 [1.42] |
| After 6 Months Exposure | | | | |
| Average Tensile Strength (MPa) | 9.13 [0.14] | 8.91 [0.21] | 7.65 [1.86] | 9.21 [0.25] |
| Average Extensibility (%) | 92.62 [4.01] | 47.15 [15.98] | 17.33 [8.7] | 55.41 [7.20] |
| Average Yield Strength (MPa) | 49.34 [0.89] | 96.40 [5.00] | 113.79 [20.22] | 83.93 [1.89] |
| Average Maximum Load (N) | 352.60 [8.73] | 341.58 [8.74] | 293.18 [71.06] | 351.26 [10.68] |
| After 9 Months Exposure | | | | |
| Average Tensile Strength (MPa) | 7.81 [0.82] | 8.05 [0.26] | 3.27 [0.67] | 9.42 [0.17] |
| Average Extensibility (%) | 26.68 [7.85] | 20.12 [4.96] | 4.01 [0.77] | 20.17 [1.72] |
| Average Yield Strength (MPa) | 87.38 [2.96] | 123.62 [5.60] | 138.51 [11.18] | 124.03 [2.36] |
| Average Maximum Load (N) | 297.03 [31.51] | 307.53 [10.20] | 125.76 [25.83] | 360.67 [6.54] |
| After 12 Months Exposure | | | | |
| Average Tensile Strength (MPa) | 7.66 [0.62] | 7.39 [0.23] | 3.33 [0.11] | 8.41 [0.10] |
| Average Extensibility (%) | 26.68 [6.97] | 29.26 [3.51] | 4.69 [0.40] | 16.81 [1.26] |
| Average Yield Strength (MPa) | 88.48 [7.82] | 92.76 [4.80] | 120.24 [3.33] | 121.85 [1.51] |
| Average Maximum Load (N) | 290.57 [22.84] | 280.96 [9.27] | 126.12 [4.28] | 321.10 |
| After 18 Months Exposure | | | | |
| Average Tensile Strength (MPa) | 4.20 [0.43] | 5.87 [0.14] | 1.48 [0.20] | 5.96 [0.42] |
| Average Extensibility (%) | 15.64 [2.17] | 23.25 [3.91] | 2.61 [0.32] | 10.09 [1.59] |
| Average Yield Strength (MPa) | 63.46 [2.25] | 79.72 [2.41] | 82.60 [3.51] | 113.70 [5.49] |
| Average Maximum Load (N) | 160.30 [16.25] | 222.45 [5.04] | 55.79 [7.46] | 226.31 [15.37] |

Hardness Data

Preferential crosslinking reaction in the amorphous phase must also be reflected in surface hardness measurements on the samples. The difference in the evolution of yield strength with duration of weathering observed between LDPE control and the nanocomposites reflected in the hardness measurements as well. Any crosslinking due to oxidation will be even more emphasized at the surface where the reactions are not diffusion-controlled, unlike in the bulk of the thick polymer sample.

Figure 3:
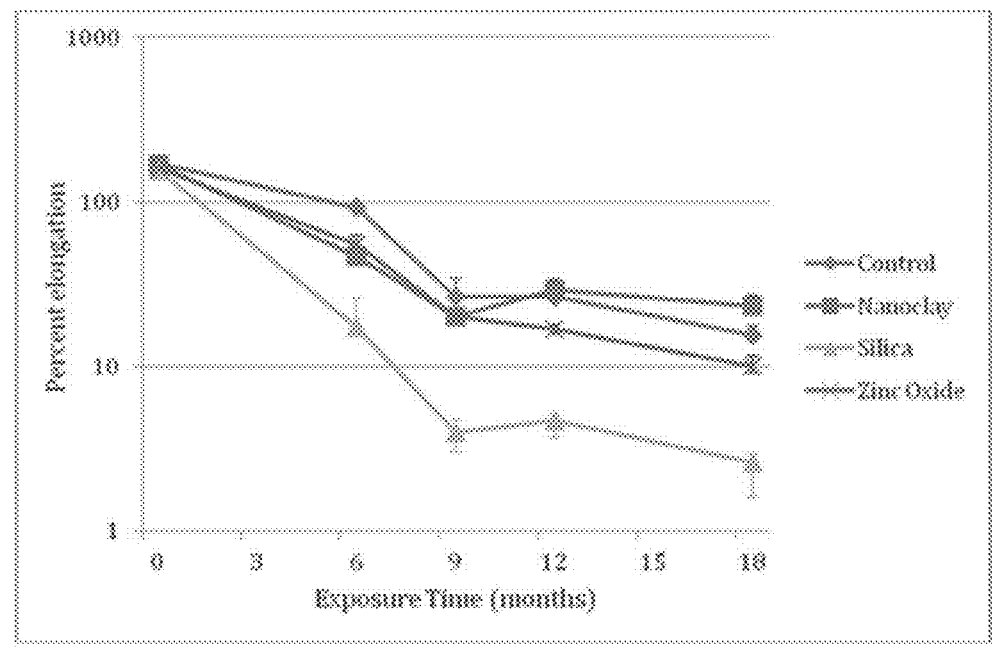
FIG. 3 is a graph showing change in average extensibility with the duration of outdoor exposure for nanocomposites.
Figure 4:
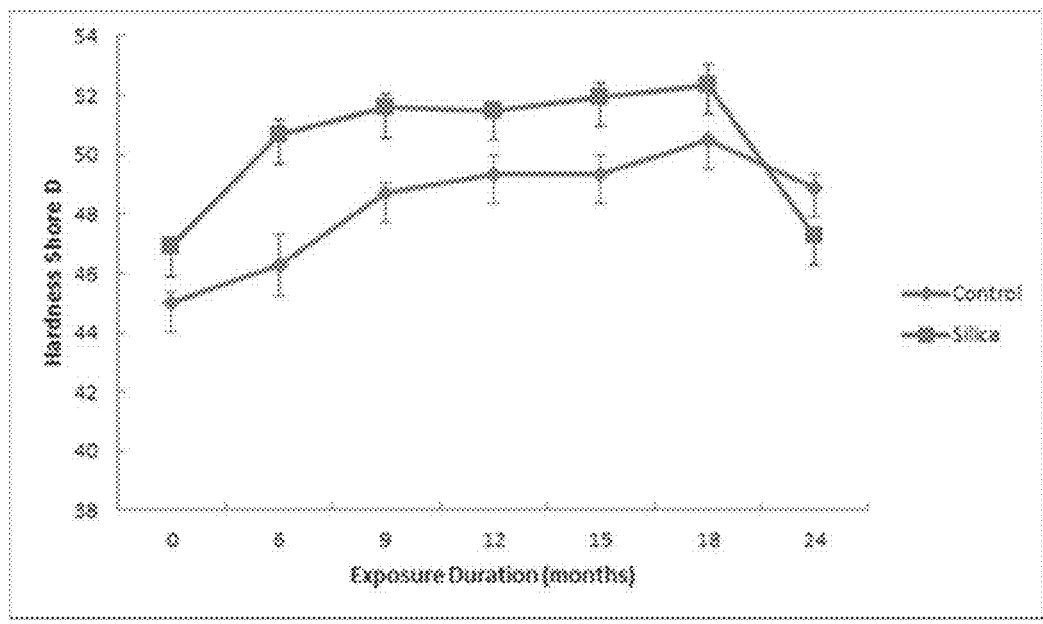
FIG. 4 is a graph showing change in mean Shore D hardness with duration of weathering.
Figure 5:
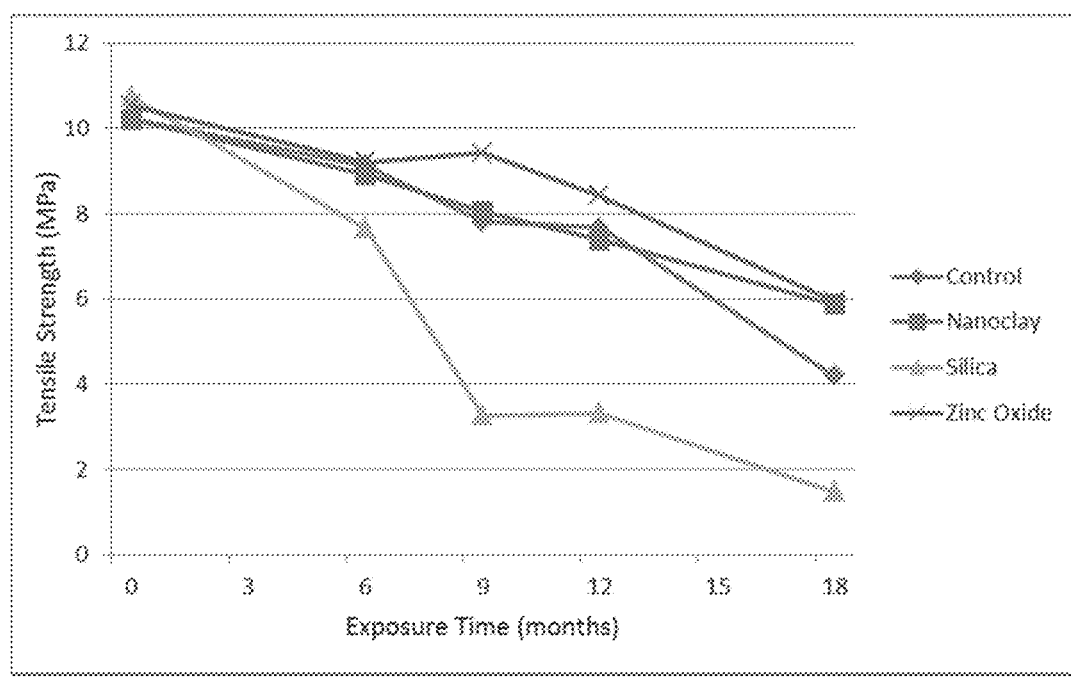
FIG. 5 is a graph showing change in average tensile strength with duration of outdoor exposure for nanocomposites.
Figures 6A, 6B:
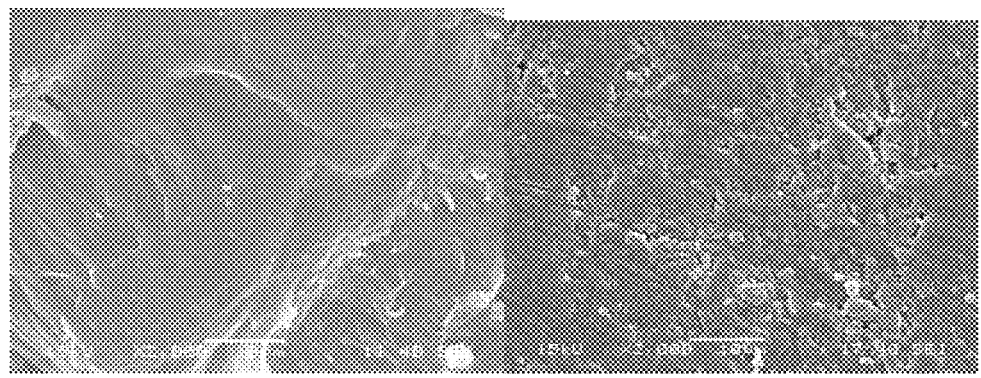
FIG. 6A is a SEM graph of an un-weathered control low-density polyethylene sample aged outdoors for 24 months at ×2000 magnification.
FIG. 6B is a SEM graph of a weathered control low-density polyethylene sample aged outdoors for 24 months at ×2000 magnification.
Figures 6C, 6D:
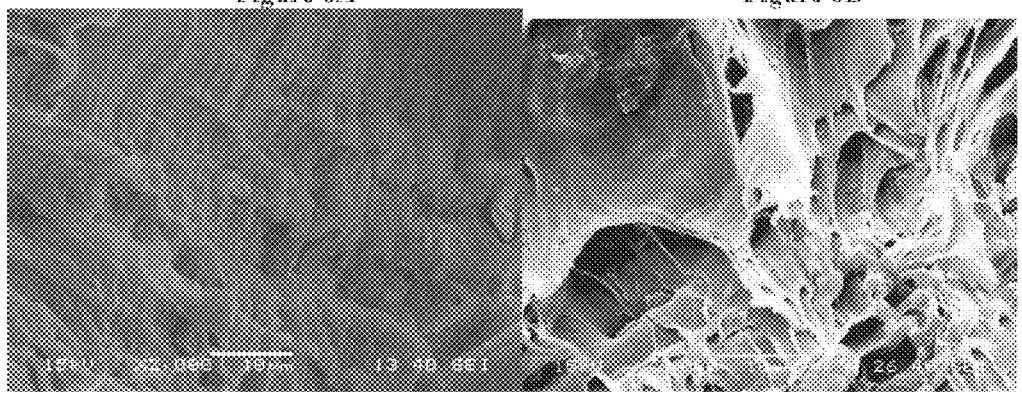
FIG. 6C is a SEM graph of an un-weathered montmorillonite clay low-density polyethylene nanocomposite sample aged outdoors for 24 months at ×2000 magnification.
FIG. 6D is a SEM graph of a weathered montmorillonite clay low-density polyethylene nanocomposite sample aged outdoors for 24 months at ×2000 magnification.
Figures 6E, 6F:
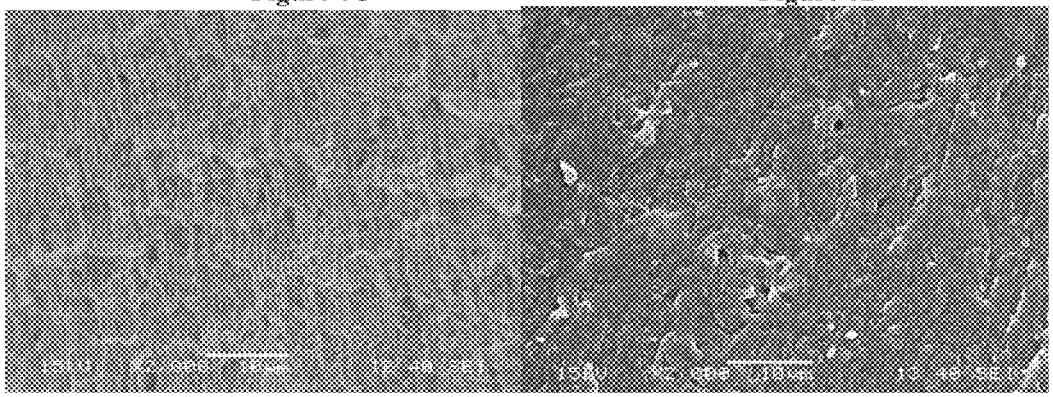
FIG. 6E is a SEM graph of an un-weathered silica low-density polyethylene nanocomposite sample aged outdoors for 24 months at ×2000 magnification.
FIG. 6F is a SEM graph of a weathered silica low-density polyethylene nanocomposite sample aged outdoors for 24 months at ×2000 magnification.
Figures 6G, 6H:
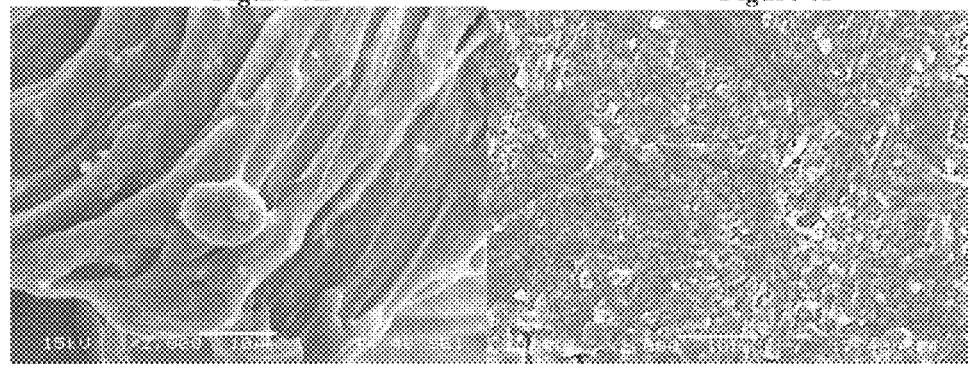
FIG. 6G is a SEM graph of an un-weathered zinc oxide low-density polyethylene nanocomposite sample aged outdoors for 24 months at ×2000 magnification.
FIG. 6H is a SEM graph of a weathered zinc oxide low-density polyethylene nanocomposite sample aged outdoors for 24 months at ×2000 magnification.

Table III summarizes the change in mean hardness with duration of exposure for the different samples. All three nanocomposite samples show similar behavior (illustrated by the data shown in FIG. 3 for Silica/LDPE nanocomposite) in that hardness increases until about 18 months of exposure and drops thereafter. The control LDPE samples however, showed a monotonic increase to reach a plateau value. The data is consistent with the changes in yield strength.

TABLE III

Change in Average Hardness Values with Duration Exposure. Mean value with standard deviation in [ . . . ] is shown.

| Duration of Exposure | Control | LDPE/MMT | LDPE/Silica | LDPE/ZnO |
|---|---|---|---|---|
| 0 months | 45.03 [0.31] | 45.73 [0.15] | 46.90 [0.26] | 44.73 [0.76] |
| 6 months | 46.27 [1.04] | 48.93 [0.12] | 50.67 [0.55] | 49.27 [0.31] |
| 9 months | 48.70 [0.36] | 49.93 [0.45] | 51.57 [0.47] | 51.57 [0.32] |
| 12 months | 49.35 [0.65] | 50.20 [0.30] | 51.50 [0.26] | 51.37 [1.12] |
| 15 months | — | 49.10 [0.89] | 51.93 [0.45] | 52.63 [0.25] |
| 18 months | 50.50 [0.10] | 48.27 [0.21] | 52.37 [0.67] | 52.33 [0.06] |
| 24 months | 48.87 [0.45] | 47.40 [0.72] | 47.27 [0.15] | 49.43 [0.42] |

Changes in Surface Morphology on Weathering

Scanning electron microscopy reveals the surface characteristics of the weathered samples. Morphology of the weathered samples is different from that of un-weathered material, generally showing cracks and fragmentation of surface layer. The change is more pronounced in the MMT nanocomposites where the aspect ratio of the filler is relatively large. The cavities on the surface likely represent areas from which the clay agglomerates have been removed due to weathering-related embrittlement. The silica nanocomposites do not show dramatically high cracking and embrittlement despite the observed large change in the bulk tensile properties on weathering.

All three nanocomposite show significant reinforcement at a level of 5 wt. % in the LDPE matrix, despite the simple melt-blending technique used to prepare these. Silica nanofiller yielded the highest efficiency of reinforcement on volume fraction basis, probably because of its propensity towards rearranging into 3-D networks in hydrophobic media.

Outdoor weathering studies show that for LDPE/MMT and LDPE/ZnO nanocomposites, efficient reinforcement with nanofillers could be obtained without sacrificing any weatherability, as assessed by changes in tensile properties and surface hardness. However, weatherability was not significantly enhanced by the nanofillers either. With the fumed silica nanofiller used here, however, a pro-oxidant effect that enhances the rate of degradation during outdoor weathering was observed.

The inventors would like to acknowledge the support provided by the Deanship of Scientific Research (DSR) at King Fahd University of Petroleum & Minerals (KFUPM), Dhahran, Saudi Arabia, for funding this work through project number IN100021.

The invention claimed is:

1. A smectite clay based low-density polyethylene nanocomposite in the form of pellets, consisting of
   a low-density polyethylene resin having a melt index of 0.8 to 1.2 g/10 minutes (190° Celsius, 2.16 kg), and
   5 weight % or more of a nanoscale montmorillonite clay modified with a quaternary ammonium salt and having a specific surface area of 10 $m^2/g$ to 50 $m^2/g$.

2. The nanocomposite of claim 1, further comprising nanoscale silica.

3. The nanocomposite of claim 1, further comprising nanoscale zinc oxide.

4. The nanocomposite of claim 1, wherein the montmorillonite clay has an agglomerate size of about 8 μm.

5. The nanocomposite of claim 1, wherein the montmorillonite clay is composed of individual platelets having a thickness of about 1 nm, an aspect ratio of greater than 50, and an interlayer spacing, determined by XRD, is about 2.52 nm.

6. The nanocomposite of claim 2, wherein the quaternary ammonium salt is N,N-dimethyl dehydrogenated tallow quaternary ammonium chloride.

* * * * *